(12) United States Patent
Long et al.

(10) Patent No.: US 6,520,881 B1
(45) Date of Patent: Feb. 18, 2003

(54) FLY-BY-WIRE ELECTRO-HYDRAULIC CONTROL MECHANISM FOR A SIX SPEED TRANSMISSION

(75) Inventors: Charles Francis Long, Pittsboro, IN (US); Martin Robert Dadel, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/922,166

(22) Filed: Aug. 6, 2001

(51) Int. Cl.[7] ............................................. F16H 31/00
(52) U.S. Cl. ...................................... 475/119; 475/128
(58) Field of Search ........................ 477/906; 475/119, 475/128

(56) References Cited

U.S. PATENT DOCUMENTS

| | | | |
|---|---|---|---|
| 4,070,927 A | 1/1978 | Polak | 74/765 |
| 4,827,806 A | 5/1989 | Long et al. | 74/869 |
| 5,601,506 A | 2/1997 | Long et al. | 475/120 |
| 5,616,093 A | 4/1997 | Long et al. | 475/120 |
| 5,681,241 A * | 10/1997 | Kubo et al. | 477/130 |
| 5,911,244 A | 6/1999 | Long et al. | 137/625.64 |
| 5,941,794 A * | 8/1999 | Jang | 477/143 |
| 6,077,182 A * | 6/2000 | Long et al. | 475/128 |
| 6,350,214 B1 * | 2/2002 | Marasugi | 475/128 |
| 6,394,926 B1 * | 5/2002 | Jang | 475/116 |
| 6,398,684 B1 * | 6/2002 | Kaizu | 475/127 |

* cited by examiner

Primary Examiner—Dirk Wright
(74) Attorney, Agent, or Firm—Leslie C. Hodges

(57) ABSTRACT

The power transmission has a fly-by-wire electro-hydraulic control mechanism that controls the engagement and disengagement of the range clutches in both forward and reverse operation. In forward operation, the control mechanism permits continued vehicle operation in the third forward range should electrical discontinuance occur during the first through fourth forward ranges, and in the fifth forward range should electrical discontinuance occur in the fifth or sixth forward range. Also, the control mechanism includes two logic valves and a forward on/off solenoid valve that permits the logic valves to control three torque-transmitting mechanisms with the use of two trim solenoid valves.

5 Claims, 14 Drawing Sheets

FLY-BY-WIRE ELECTRO-HYDRAULIC CONTROL MECHANISM FOR A SIX SPEED TRANSMISSION

TECHNICAL FIELD

This invention relates to electro-hydraulic control mechanisms for use in automatic shifting power transmissions and, more particularly, to fly-by-wire control mechanisms.

BACKGROUND OF THE INVENTION

Many of the currently-available high performance planetary transmissions utilize what has been termed clutch-to-clutch shifting. This term indicates that the ratio interchange is performed by disengaging one plate-type friction device while engaging another plate-type friction device. This is accomplished without the use of one-way devices. Therefore, the overlap control must be quite accurate to prevent any disruption in the power flow from the transmission input to the transmission output.

At least one planetary transmission that is utilized with clutch-to-clutch shifting controls is shown in U.S. Pat. No. 4,070,927, issued to Polak on Jan. 31, 1978. This transmission is equipped with solenoid controlled trim valves that are actuated by electronic control units to provide engagement and disengagement pressures for the torque transmitting friction devices within the transmissions. One such solenoid control system is shown in U.S. Pat. No. 5,601,506, issued to Long et al. on Feb. 11, 1997. Also, the transmissions in this category desire to use what is known as skip-shifting, that is, a first-to-third ratio interchange or a second-to-fourth ratio interchange, etc. The above-identified patent to Long et al. does not provide for skip-shifting.

It is also desirable to ensure that the vehicle incorporating the transmission can return to a repair unit in the event of the discontinuance of electrical power. This is known as limp-home capability. Two such currently-known patents provide limp-home capabilities for power transmissions, one of which is U.S. Pat. No. 4,827,806, issued to Long et al. on May 9, 1989, and U.S. Pat. No. 5,616,093, also issued to Long et al. on Apr. 1, 1997.

The above-identified patents issued to Long et al. utilize trim valves in combination with shift valves to control the pressure within the on-coming and off-going friction devices. The trim valves are equipped with variable pressure solenoid valves while the shift valves are controlled by on/off type solenoid valves.

In order to reduce the use of shift valves, trim valves, such as that shown in Long et al., U.S. Pat. No. 5,911,244, have been provided as control features which require only a single trim pressure, that is, a variable solenoid valve, to be utilized in controlling the shift valve so as to provide a variable brake pressure increase to the on-coming friction device.

These types of variable pressure trim valves have been proposed for power transmission controls as disclosed in co-pending U.S. Ser. No. 10/025,232, filed Dec. 19, 2001, which is assigned to the assignee of the present application.

All of the above-described electro-hydraulic control systems require the use of a manually-operated control valve wherein a direct mechanical connection between the operator and a valve controlling forward, reverse and neutral operating conditions is provided.

SUMMARY OF THE INVENTION

It is an object of the present invention to provide an improved electro-hydraulic control mechanism for a multi-speed power transmission having a fly-by-wire control system.

In one aspect of the present invention, electro-hydraulic control has a pair of logic valves, a system pressure regulator valve, and a control pressure regulator valve for selectively distributing a bias control pressure to the system regulator valve through one of the logic valves.

In another aspect of the present invention, the bias control pressure is distributed to a bias area and a system regulator valve when the one logic valve is in a pressure set position.

In yet another aspect of the present invention, a variable bias pressure is selectively distributed from a trim pressure control valve through both of the logic valves to the bias area on the system pressure regulator valve.

In still another aspect of the present invention, the variable bias pressure is distributed only when one logic valve is in a spring set position and the other logic valve is in a pressure set position.

In yet still another aspect of the present invention, the electro-hydraulic controls provide for the selective distribution of engagement pressure with two torque transmitting mechanisms from one trim control valve.

In a still further aspect of the present invention, the electro-hydraulic control will establish the third forward ratio if the electro-hydraulic controls are discontinued during normal operation in first through fourth forward drive ranges or ratios.

In yet still another aspect of the present invention, the electro-hydraulic control will establish the fifth forward ratio if the electronic portion of the controls is discontinued during normal operation in the fifth or sixth forward drive ratio.

In still another aspect of the present invention, one of the logic valves incorporates a bias pressure from one of the torque-transmitting mechanisms which maintains the logic valve in a spring set position until the torque-transmitting mechanism is disengaged.

In still another aspect of the present invention, the pressure bias logic valve provides the capability to distribute control pressure to two torque-transmitting mechanisms from a single trim valve.

DESCRIPTION OF THE PREFERRED EMBODIMENT

Figure 1:
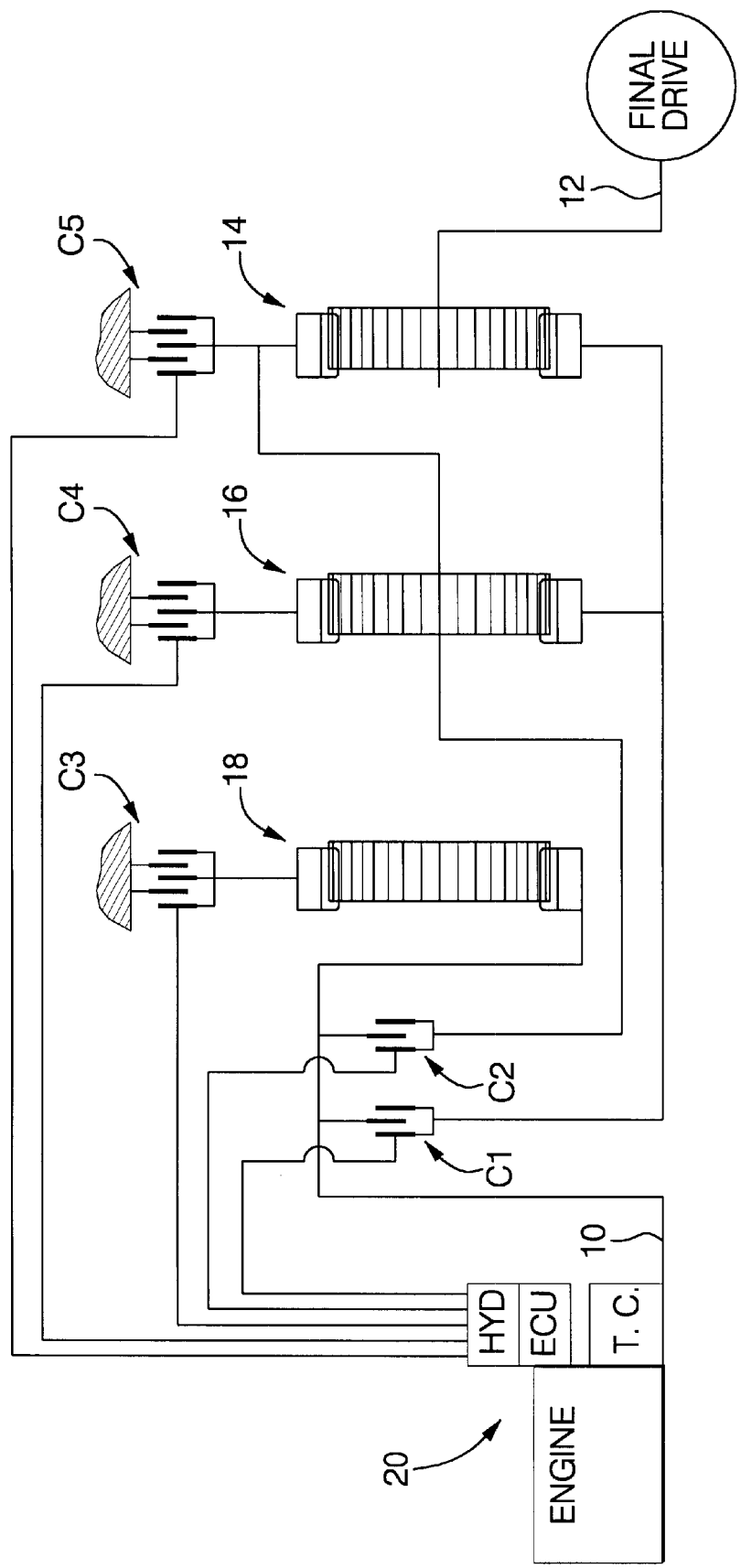
FIG. 1 is a schematic representation of a multi-speed power transmission incorporating the present invention.

The power transmission, as shown in FIG. 1, includes an engine and torque converter (TC), an input shaft 10, an output shaft 12, and three planetary gearsets 14, 16 and 18. The planetary gearsets are controlled to provide six forward speed ratios, a reverse speed ratio and a neutral condition between the input shaft 10 and the output shaft 12. These conditions are provided by five torque-transmitting mechanisms C1, C2, C3, C4 and C5. The torque-transmitting mechanisms C1 and C2 are rotating clutch-type torque-transmitting mechanisms while the torque-transmitting mechanisms C3, C4 and C5 are stationary clutch- or brake-type torque-transmitting mechanisms.

The torque-transmitting mechanisms C1, C2, C3, C4 and C5 are all selectively engageable hydraulically-controlled torque-transmitting mechanisms, which are well known in the art of power transmissions. The hydraulic fluid to engage these torque-transmitting mechanisms is provided by an electro-hydraulic control mechanism 20 that includes an electronic control unit (ECU), which incorporates a programmable digital computer to provide electronic signals to a hydraulic control (HYD) which, in turn, distribute the hydraulic fluid to the various torque-transmitting mechanisms.

The ECU receives a number of input signals from the engine, the torque converter, and also the transmission elements in the vehicle which partially determine the electronic signal that are generated and distributed to the hydraulic system to provide for the upshifting and downshifting of the transmission by controlling the engagement and disengagement of the torque-transmitting mechanisms.

As seen in FIGS. 2 through 14, the hydraulic portion of the electro-hydraulic control 20 includes a pump 22, which draws fluid from a sump or reservoir 24 and distributes the fluid through a main passage 26. Main passage 26 is in continuous fluid communication with a main regulator valve 28, a C1 forward logic valve 30, a trim valve 32, a trim valve 34, a trim valve 36, a trim valve 38, a trim valve 40, and a control regulator valve 42.

The main regulator valve 28 is effective to set the system pressure within the passage 26. The main regulator valve 28 has a bias area 44 on the upper end of the valve 28, a differential area bias 46 that is in fluid communication with a passage 48, and a second differential area bias 46A that is in fluid communication with a fluid passage 50. The pressure regulator valve 28 supplies the fluid to the main passage 26 and when the pressure in that passage has been satisfied, the regulator valve 28 distributes pressure to a passage 52 that is in communication with a converter flow valve 54 which, in turn, communicates with a converter regulator valve 56 which, in turn, distributes fluid to the torque converter (TC). If there is excess fluid after the torque converter is satisfied, the remaining fluid is distributed through the sump 24 to a return passage 58.

The control regulator valve is essentially a conventional downstream regulator valve 42 which accepts fluid from passage 26 and reduces the pressure therein for distribution to a control passage 60 which communicates fluid to a variety of variable solenoid valves 62, 64, 66, 68 and 70, and to an on/off solenoid valve 72.

The solenoid valve 62 is controlled by the ECU to establish the control pressure in a passage 74, which determines the pressure distributed from the trim valve 32 to a passage 76 that is in communication with the torque-transmitting mechanism C3. The solenoid valve 64 controls the pressure in passage 77 that is distributed to the trim valve 34 to control the pressure in a passage 78 that is in fluid communication with a C2 forward logic valve 80.

The solenoid valve 66 controls fluid pressure in a passage 82 which is effective to establish the output pressure of the trim valve 36 in a passage 84 that is in fluid communication with the torque-transmitting mechanism C4. The solenoid valve 68 distributes control pressure to a passage 86, which is effective to establish the output pressure of the trim valve 38 in a passage 88 which is distributed to the C1 logic valve 30. The solenoid valve 70 is effective to provide a control pressure in the passage 90 which establishes the outlet pressure of the trim valve 40 in a passage 50 that communicates with the bias area 46A on the regulator valve 28, the converter flow valve 54, and a conventional torque converter clutch 94.

When the converter flow valve 54 is in the spring set position shown, the pressure in passage 52 is distributed through the valve 54 and the valve 56 to the torque converter (TC). Flow out of the torque converter (TC) is distributed through a return passage 96 through the converter flow valve 54 to a cooler 98. The fluid returning from the cooler 98 passes through a lube circuit 100, which distributes fluid to lubricate the various components of the transmission such as gears and bearings.

The C1 logic valve 30 has a spring set position which is established by a spring 102 and a pressure set position which is established by fluid pressure in a passage 104 that communicates with the solenoid valve 72. The solenoid valve 72 is an on/off type solenoid that is either distributing pressure or not distributing pressure, as opposed to the solenoid valves 62, 64, 66, 68 and 70, which distribute the variable output pressure depending upon the signal received from the electronic control unit.

In the spring set position shown, the fluid in passage 26 is distributed through the valve 30 to a passage 106 that communicates with the C2 logic valve 80. The passage 48 communicates through the valve 30 with a passage 108 that communicates with the C2 logic valve 80. The passage 88 is blocked at the valve 30 when the spring set position is established to prevent distribution to a passage 110 that communicates with the torque-transmitting mechanism C1.

An exhaust passage 112 also communicates with the valve C1 and with an exhaust backfill regulator valve 114. The backfill regulator valve 114 establishes a minimum pressure within the system, which can be utilized to maintain the torque-transmitting mechanisms with at least a minimum pressure which simplifies the engagement and disengagement control pressure schedule of these torque-transmitting mechanisms. The use of a backfill pressure valve is well known in the art.

The C1 valve 30 has, as previously mentioned, a pressure set position wherein the exhaust passage 112 is blocked, the passage 88 communicates with the torque-transmitting mechanism C1, the main passage 26 is blocked, the passages 106 and 108 are disposed in fluid communication, and the passage 60, which contains the control pressure from the control regulator 42, is connected with the passage 48 which, in turn, as previously described, communicates with the bias area 46 on the main regulator valve 28. Thus, whenever the C1 valve 30 is in the pressure set position, the control pressure from and regulator valve 42 is distributed to the main regulator valve 28 to limit the maximum system pressure that can be attained in the passage 26. For example, the pressure in passage 60 might be as high as 100 psi, which could limit the pressure in passage 26 to a maximum value of 230 psi. When the bias areas 46 and 46A are not pressurized, the maximum system pressure can be established at 270 psi.

The C2 logic valve 80 has a spring set position established by a spring 116 and a pressure set position established by the fluid pressure in passage 104. In the spring set position, the passage 106 is blocked by the valve 80, the passage 108 is connected with the exhaust passage 112, the torque-transmitting mechanism C2 is connected with the exhaust passage 112 through a passage 118, the passage 78 is connected with a passage 120 that communicates with both the torque-transmitting mechanism C5 and a chamber 122 surrounding the spring 116.

In the pressure set position of the C2 logic valve 80, the passage 120 is connected with the exhaust passage 112, the passage 78 is connected with the passage 108, and the passage 106 is communicated with the passage 118 in the torque-transmitting mechanism C2. If the combination of the valves 30 and 80 are both in the spring set position, the fluid pressure in the passage 78 is communicated to the passage 108, the passage 106, and the passage 118 to establish a pressure at the torque-transmitting mechanism C2. When the valve 80 is in the spring set position, the pressure in passage 78 communicates with the pressure in passage 120 and the torque-transmitting mechanism C5.

Those skilled in the art will recognize that the trim valve 34 is effective to control the pressure in the torque-transmitting mechanism C5 or the pressure in the torque-transmitting mechanism C2. Since these torque-transmitting mechanisms are mutually exclusive in the operation of the transmission, this combination of valves reduces the number of trim valves required. As can be ascertained by a viewing of the above description, the control utilizes four trim valves to control five torque-transmitting mechanisms.

When the C1 valve 30 is in the spring set position and the C2 valve 80 is in the pressure set position, the pressure in passage 78 is distributed to the pressure in passage 108 and through the valve 30 to the passage 48, which is in communication with the area bias 46 on the regulator valve 28. This will permit a variable pressure to control of the main system pressure in this condition of valve setting so that the fuel economy of the vehicle can be more closely controlled. For example, if the pressure in the passage 78 is controlled from zero to line pressure, the output pressure in passage 26 is controlled from 230 psi to 100 psi, or corresponding points in between. This control pressure can be dependent upon such things as engine torque, vehicle speed, and other operating characteristics such as the engagement or disengagement of the torque converter clutch. This pressure in passage 78 is established by the ECU which receives the various control signals. By permitting the main pressure passage 26 to be reduced significantly, the horsepower required by the pump 22 is significantly reduced thereby saving fuel during the operation of the vehicle when the valve setting of C2 valve 80 and C1 valve 30 are as just described.

Figure 2:
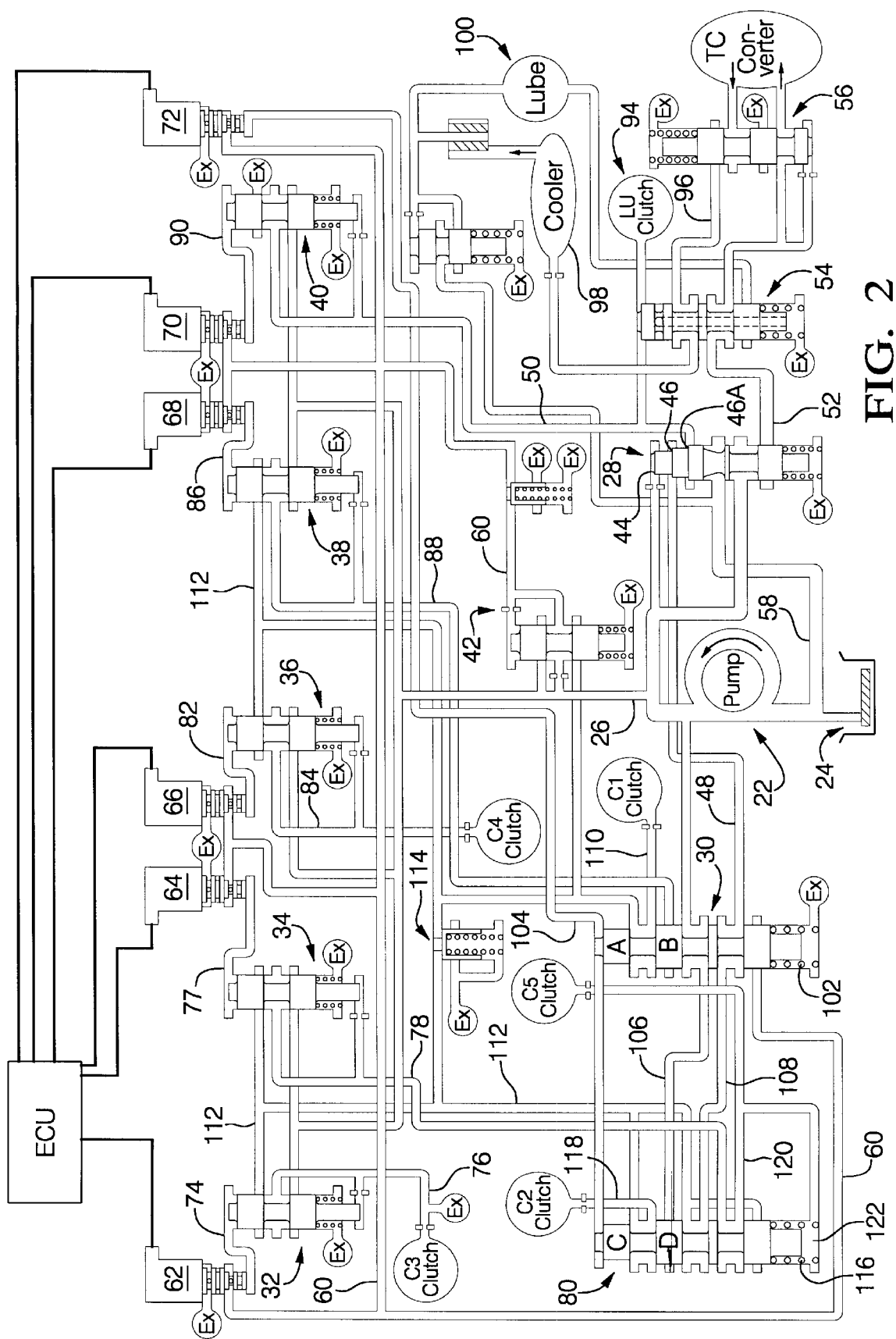
FIG. 2 is a diagrammatic representation of an electro-hydraulic control system incorporating the present invention and utilized with the power transmission shown in FIG. 1 when the transmission is operating in reverse.
Figure 3:
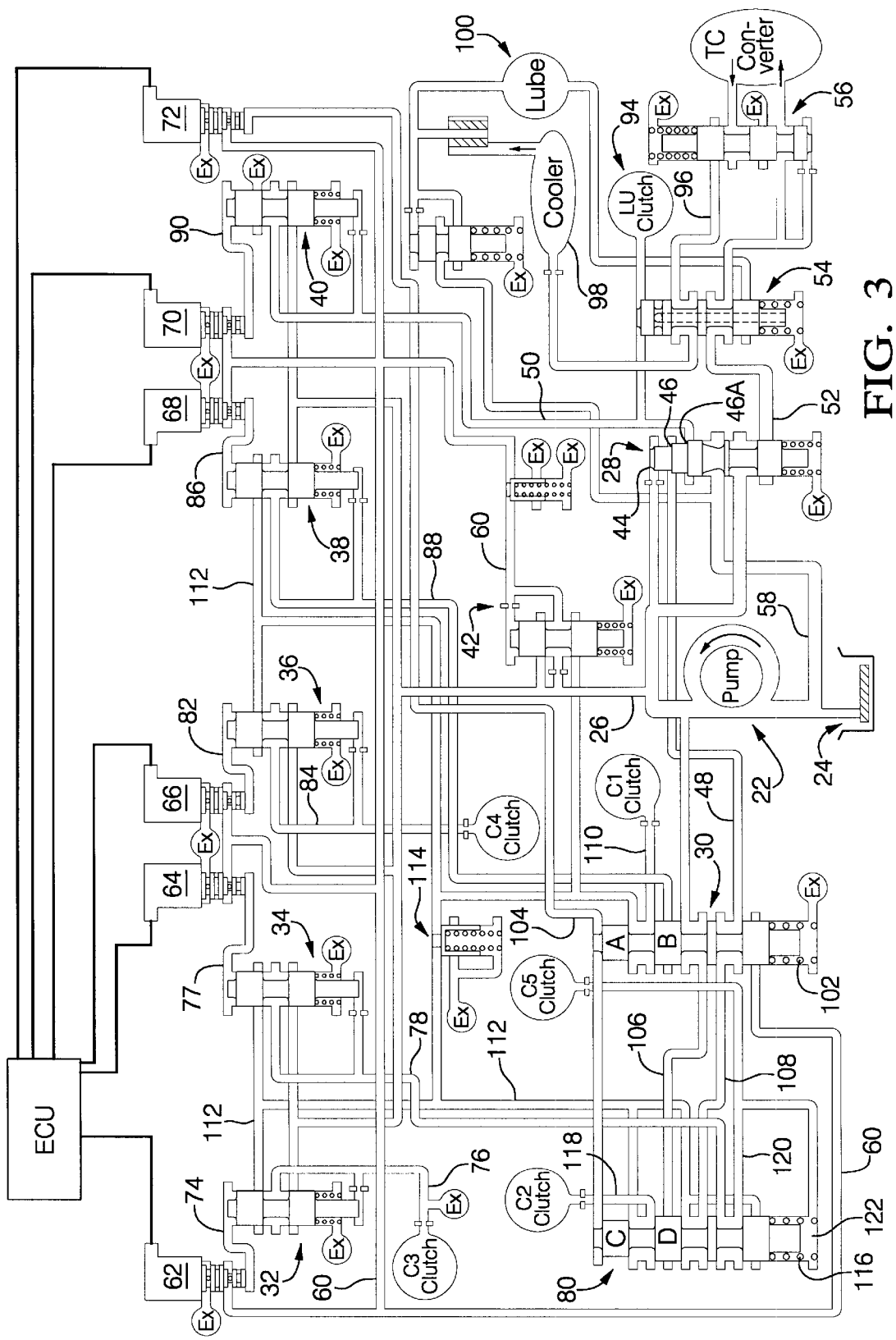
FIG. 3 is a diagrammatic representation with the electro-hydraulic control incorporating the present invention conditioned for operation in neutral.

As shown in FIG. 2, the hydraulic portion of the control system 20 is shown in the reverse speed range condition. In FIG. 3, the hydraulic portion of the control mechanism is shown in neutral. In neutral, the valves 30 and 80 are both in the spring set position and the torque-transmitting mechanism C5 is engaged by fluid pressure distributed from the trim valve 34 through the C2 logic valve 80. On a shift from neutral to reverse, the torque-transmitting mechanism C5 remains engaged by fluid pressure distributed from the trim valve 34, and the torque-transmitting mechanism C3 is brought into engagement in a controlled manner by fluid pressure distributed by the trim valve 32. The pressure in the passage 76 is controlled by the amount of control pressure that the solenoid 62 distributes through the passage 74 to the trim valve 32.

The solenoid valve 62 is a normally open solenoid. However, when electrical energy is reduced to the solenoid 62, the control pressure in passage 74 can be increased from a minimum setting to a maximum setting, which will permit increase in the pressure distributed to the passage 76. It should also be noted that in both neutral and reverse the fluid pressure in the torque-transmitting mechanism C5 is distributed to the spring chamber 122 of the C2 logic valve 80, thereby assisting the spring 116 to maintain the valve 80 in the spring set position regardless of other pressure biases in the system.

Figure 4:
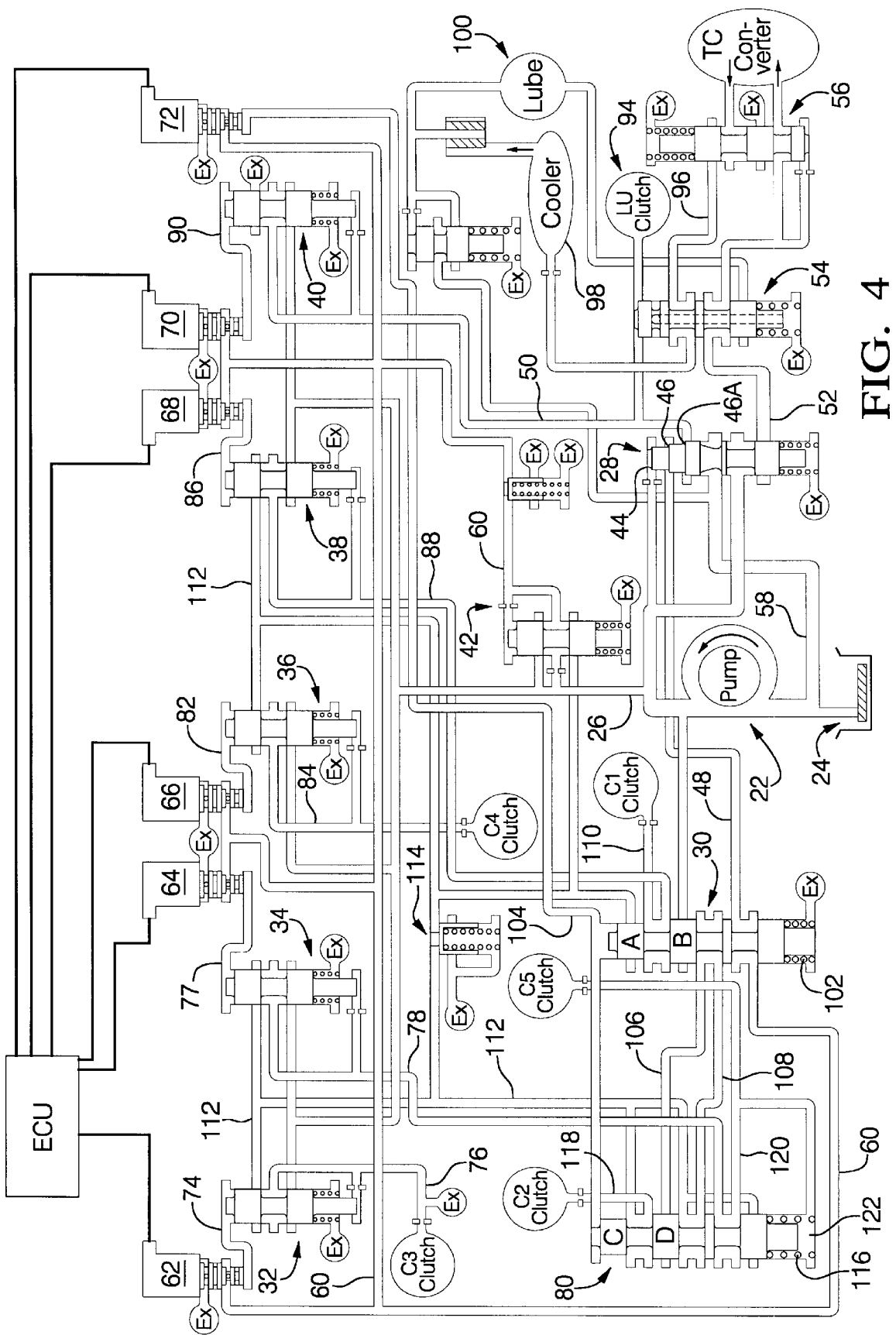
FIG. 4 is a diagrammatic representation with the electro-hydraulic control incorporating the present invention conditioned for operation in the first forward speed range.
Figure 5:
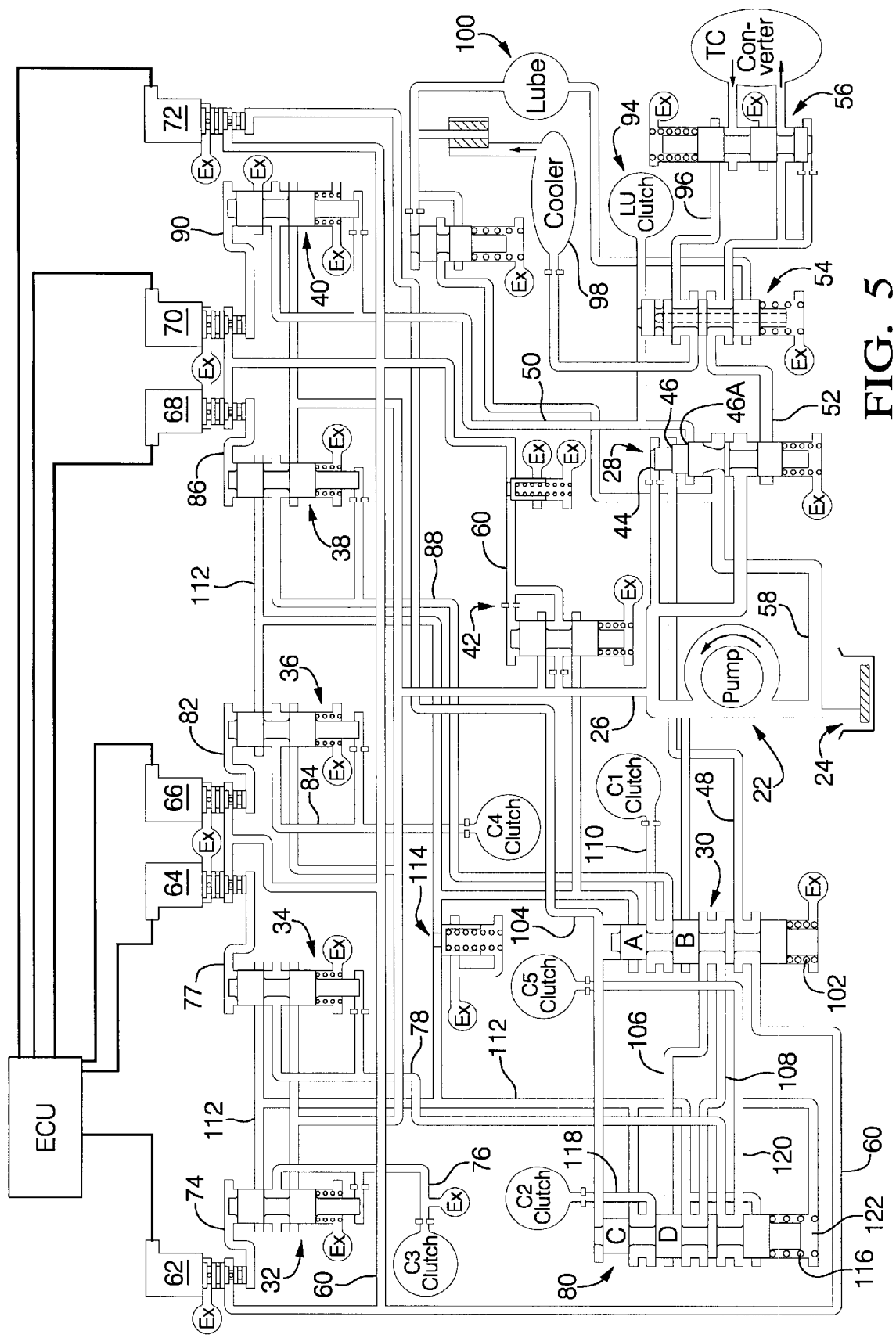
FIG. 5 is a diagrammatic representation with the electro-hydraulic control incorporating the present invention conditioned for operation in the second forward speed range.
Figure 6:
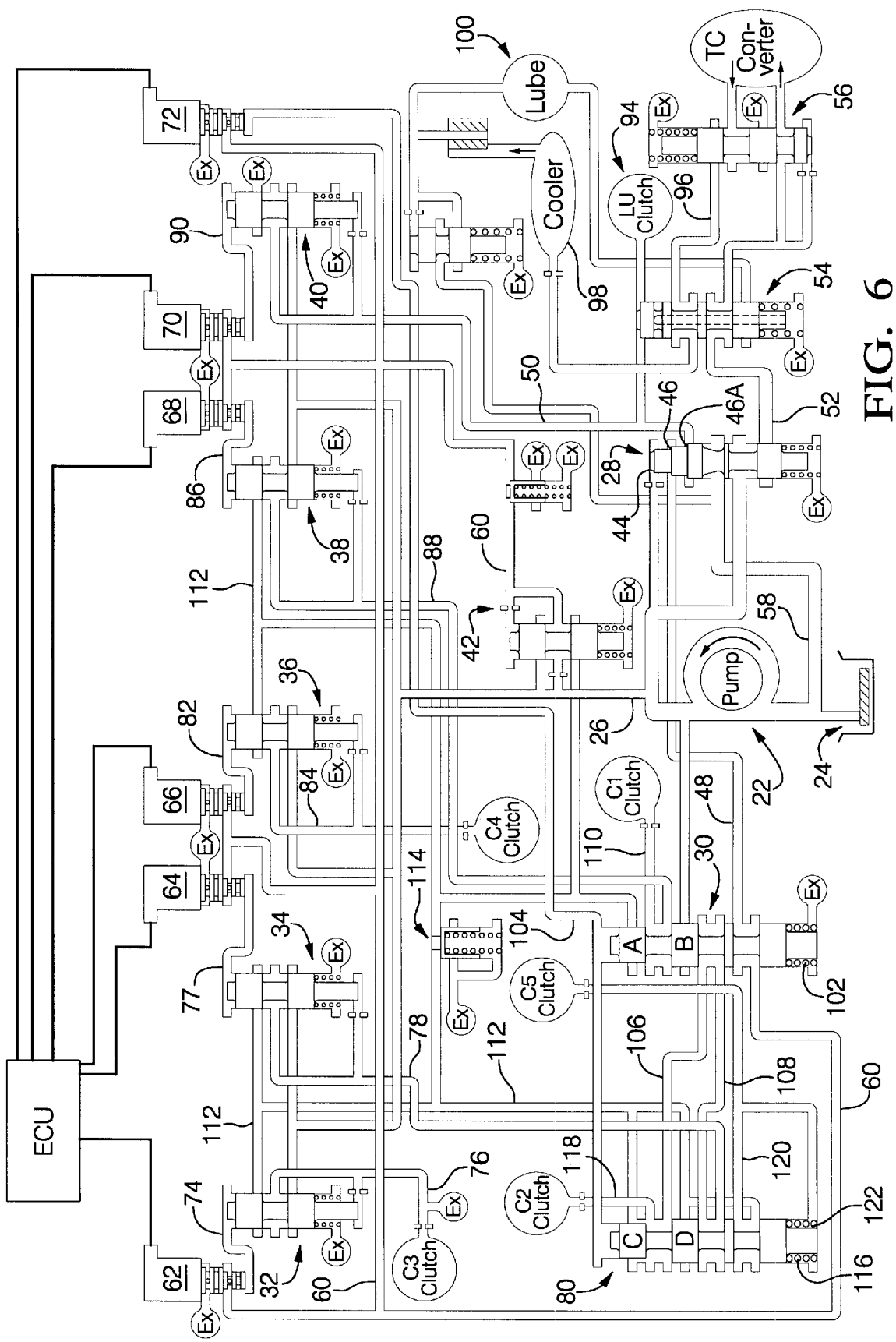
FIG. 6 is a diagrammatic representation similar to FIG. 5 with the electro-hydraulic control incorporating the present invention also conditioned for the second forward speed range.
Figure 7:
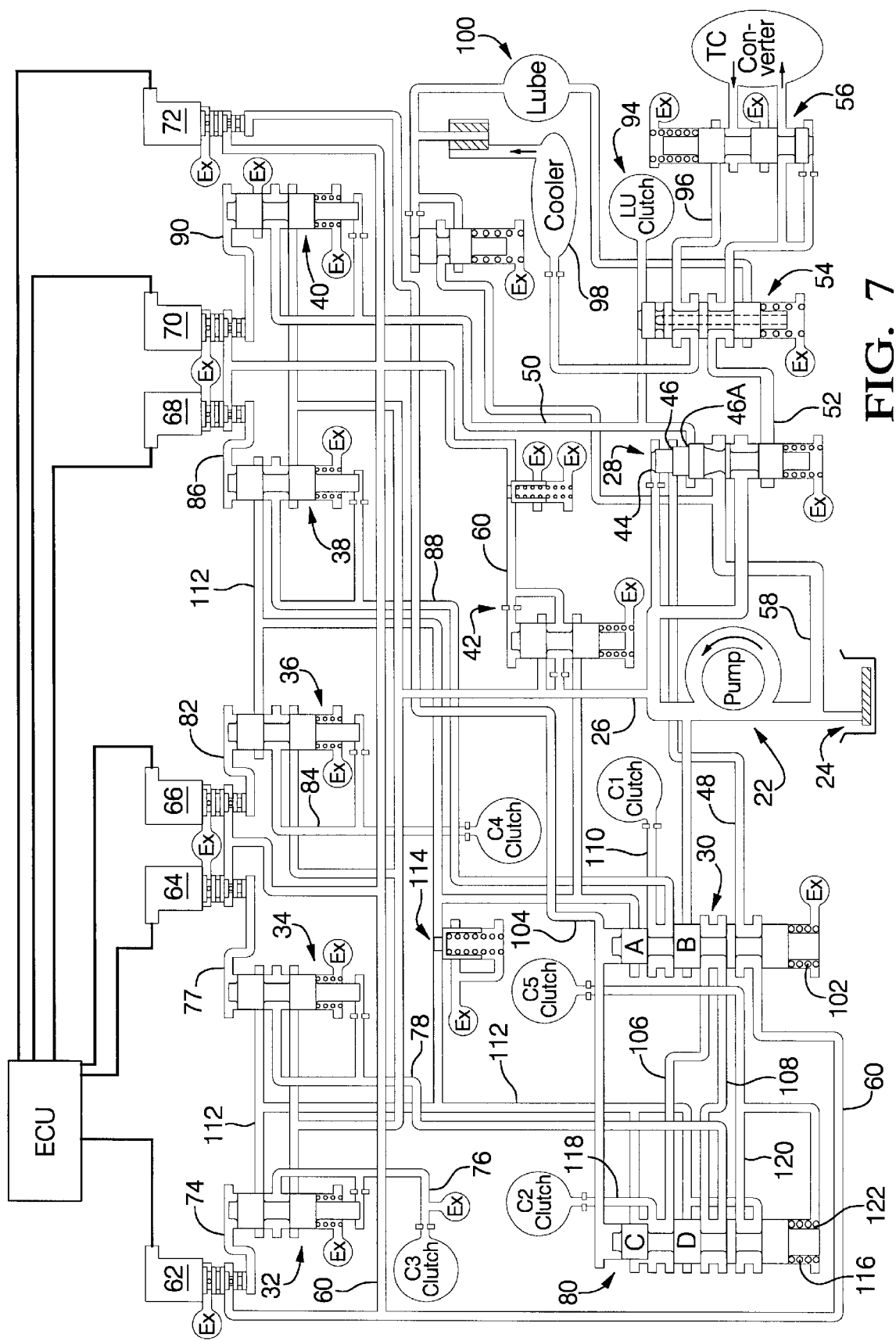
FIG. 7 is a diagrammatic representation with the electro-hydraulic incorporating the present invention conditioned for the third forward speed range.
Figure 8:
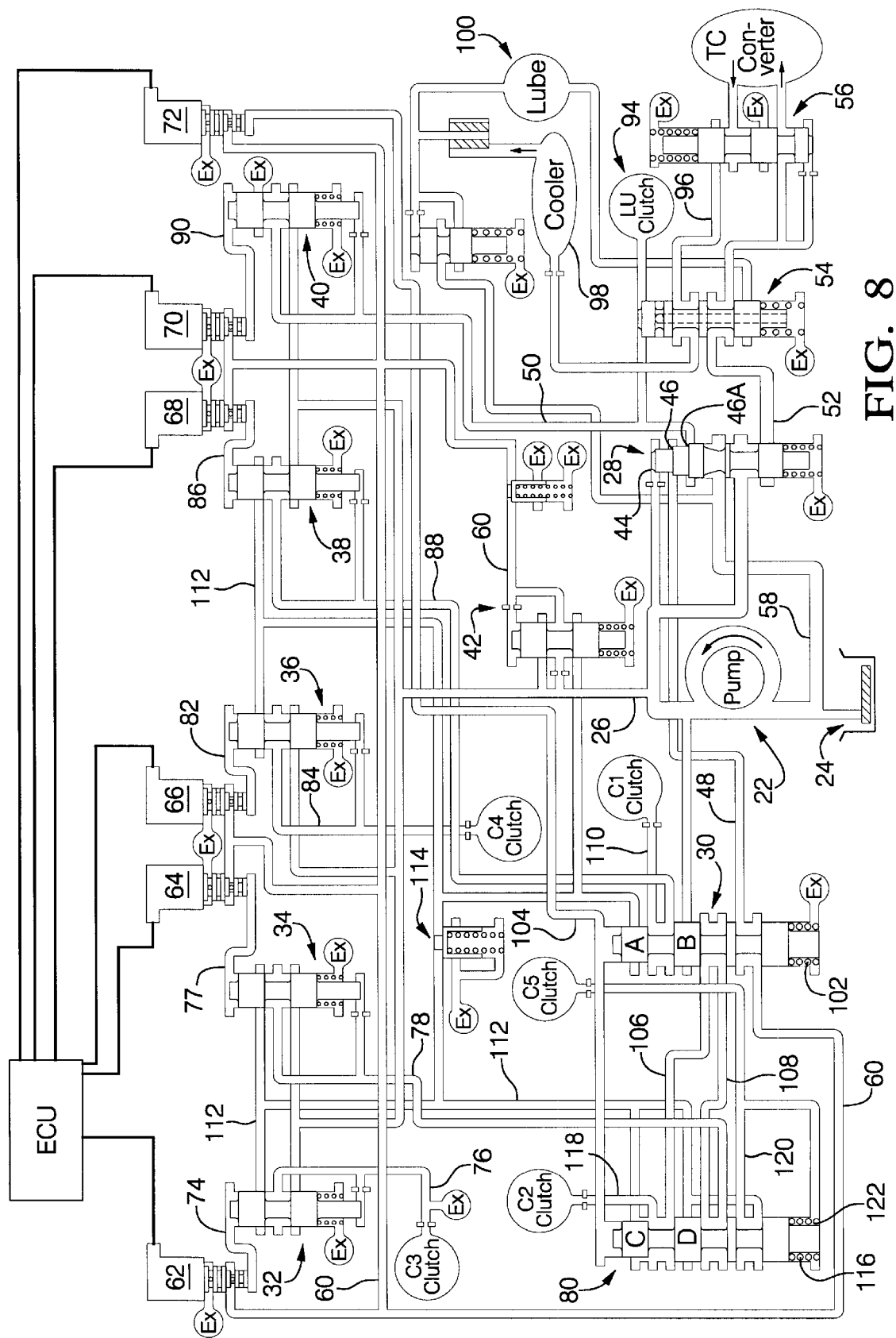
FIG. 8 is a diagrammatic representation of the electro-hydraulic control mechanism incorporating the present invention with the electro-hydraulic conditioned for the fourth forward speed range.
Figure 9:
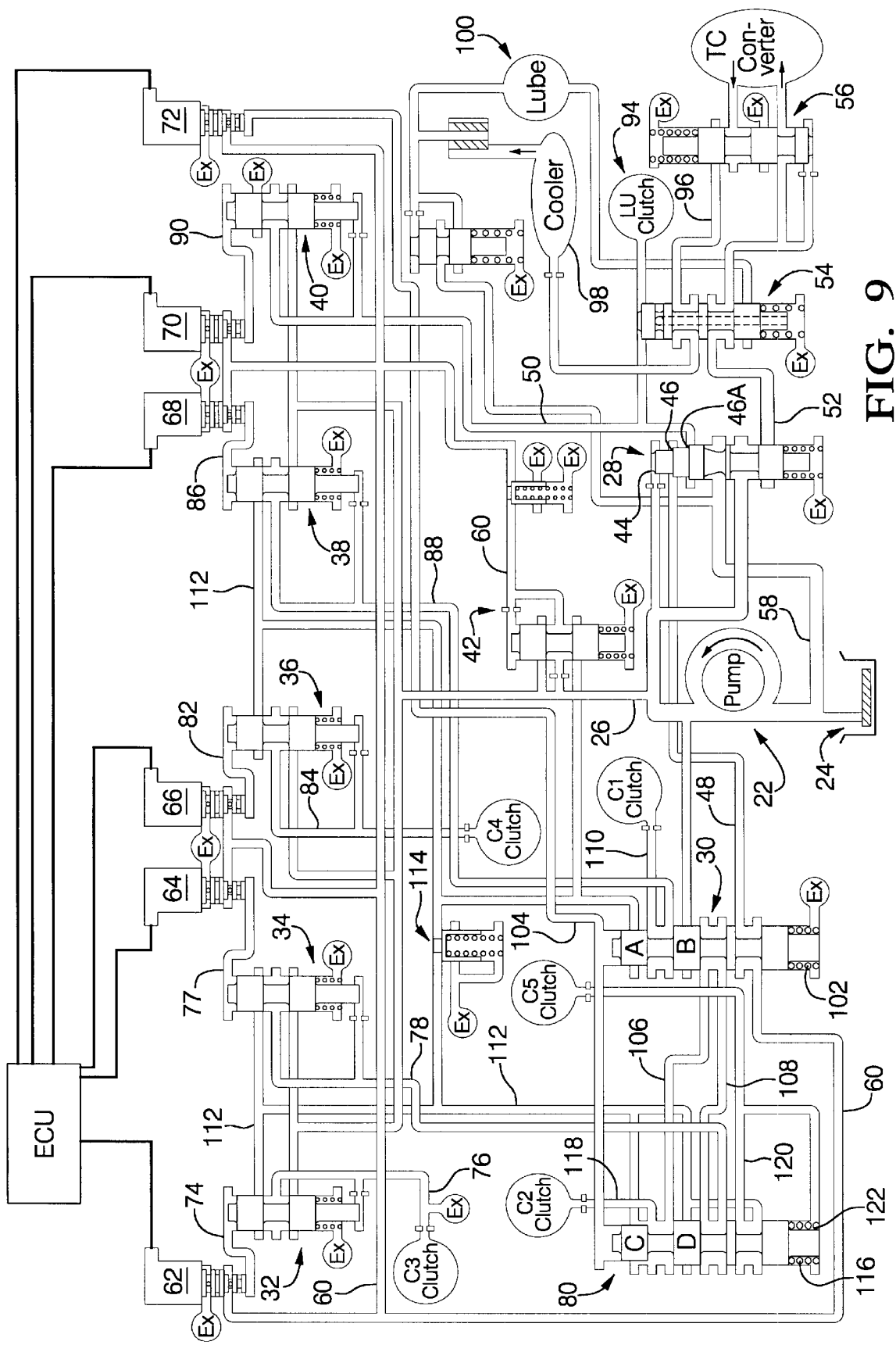
FIG. 9 is a diagrammatic representation of the electro-hydraulic control mechanism incorporating the present invention with the electro-hydraulic control system conditioned for the fifth forward speed range.
Figure 10:
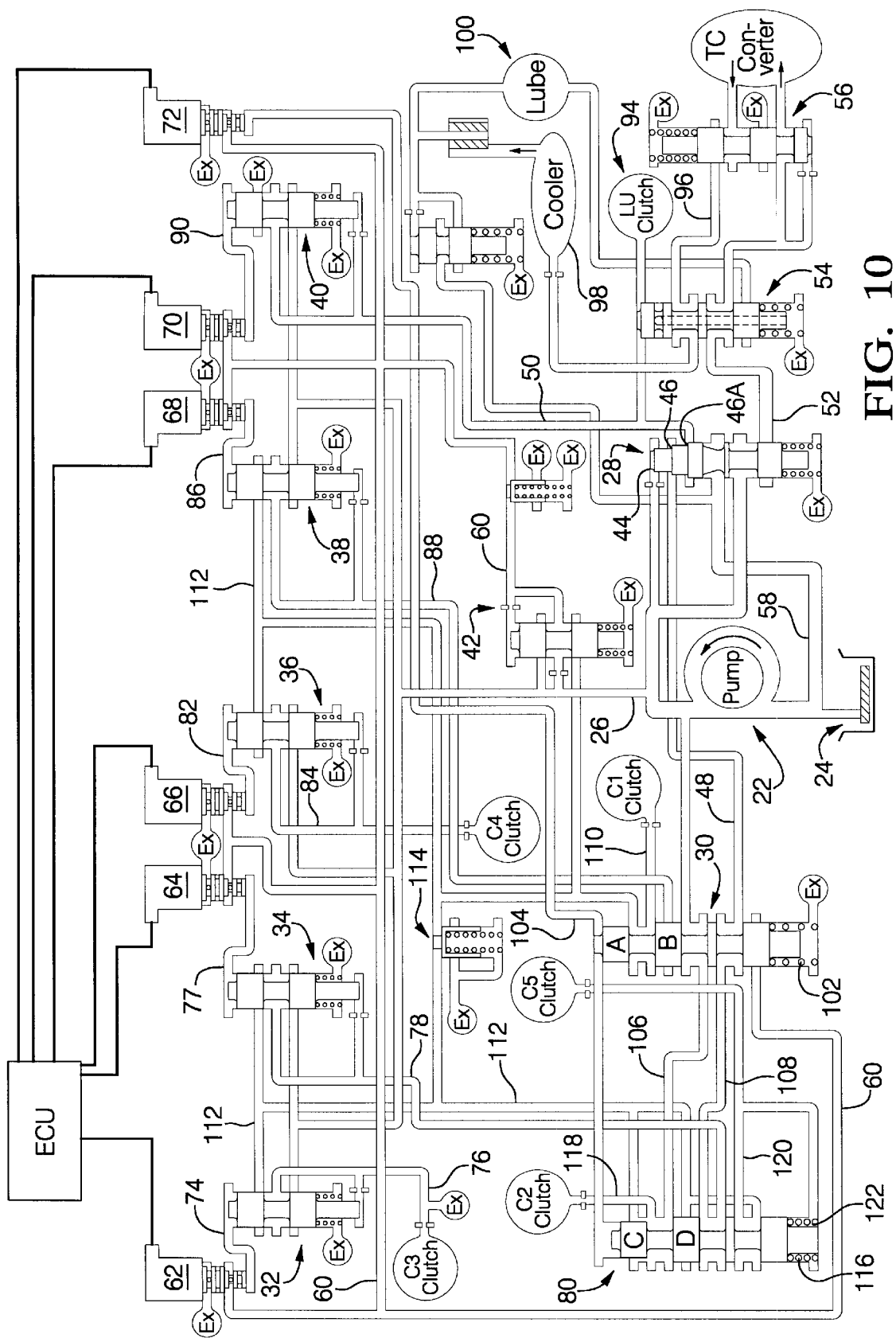
FIG. 10 is a diagrammatic representation of the electro-hydraulic control mechanism incorporating the present invention with the electro-hydraulic control system conditioned also for fifth forward speed range.
Figure 11:
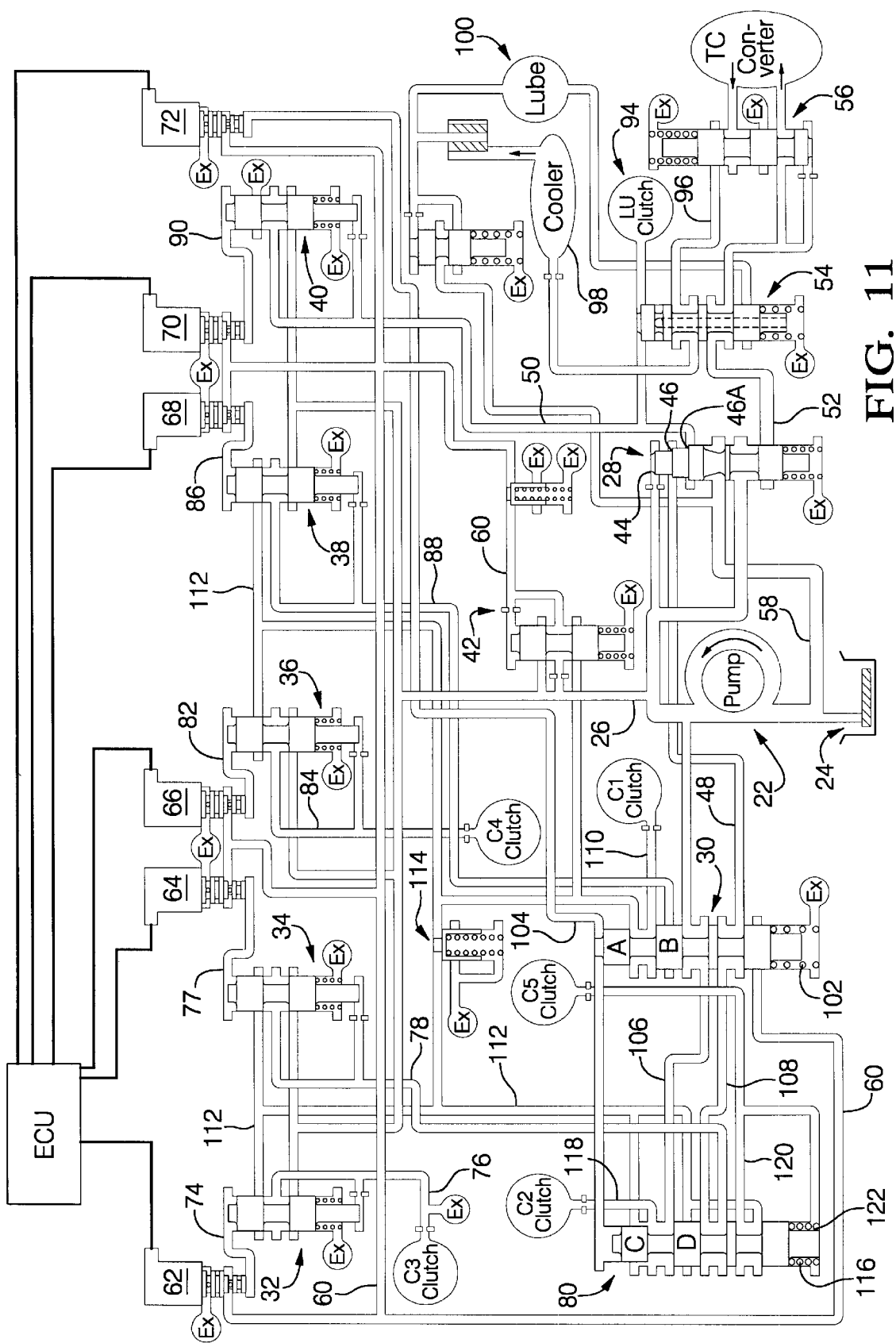
FIG. 11 is a diagrammatic representation of the electro-hydraulic control mechanism incorporating the present invention with the electro-hydraulic control system configured to provide the sixth forward speed range.
Figure 12:
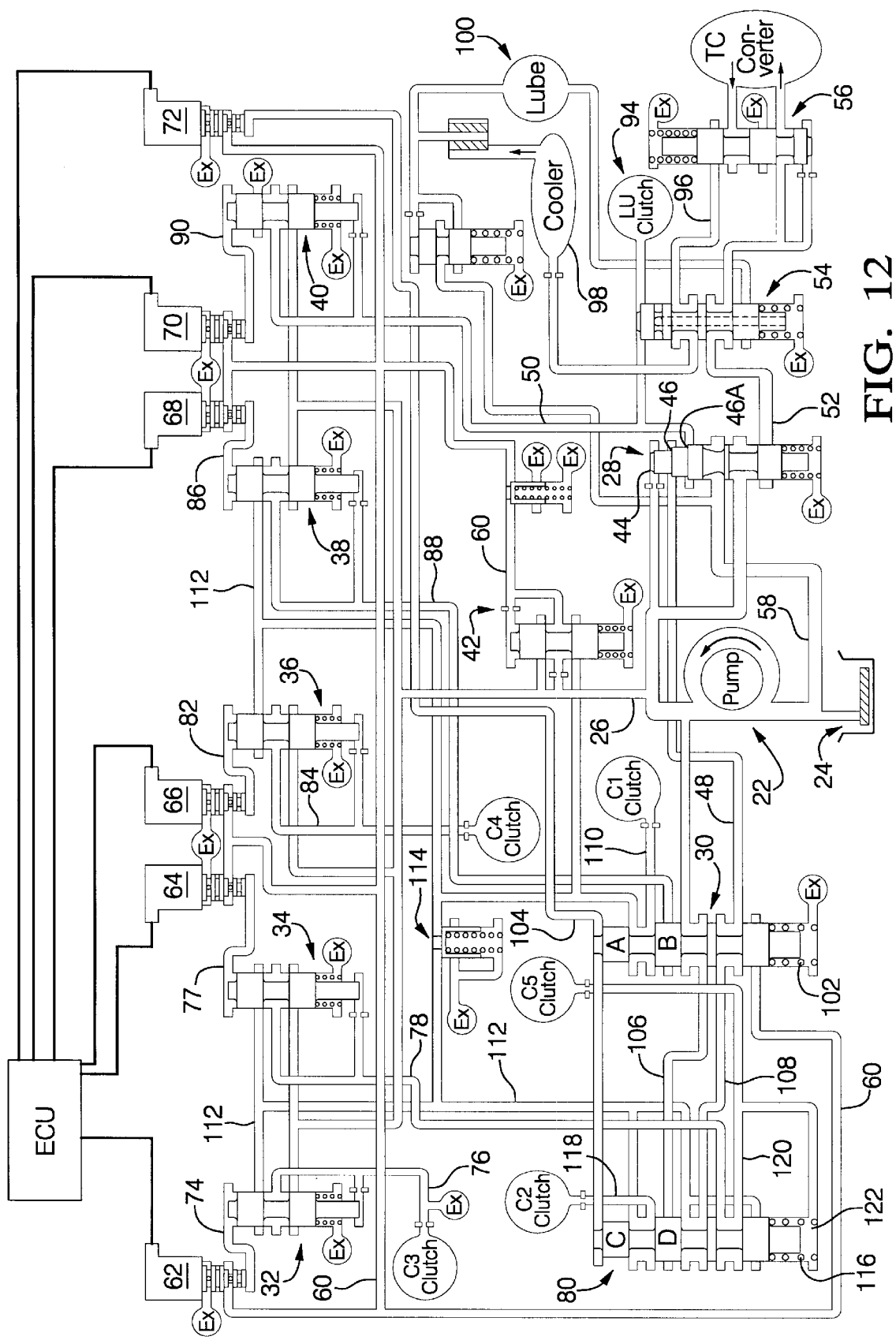
FIG. 12 is a diagrammatic representation of the electro-hydraulic control mechanism incorporating the present invention in both the reverse speed range and neutral when electrical power has been discontinued.

When the transmission is shifted from neutral or from reverse to the first forward speed range, the hydraulic valve mechanism will be as shown in FIG. 4. In the first forward range, the solenoid valve 72 is turned on thereby distributing a control pressure in the passage 104, which is directed to both the valves 30 and 80. The valve 30 will assume the pressure set position; however, the valve 80 will remain spring set, since the pressure in the passage 120 plus the spring force is greater than the bias force that is created by the pressure in passage 104. Thus, the torque-transmitting mechanism C5 remains engaged.

The solenoid valve 68 is controlled to provide a pressure in the passage 88, which is distributed through the valve 30 to the torque-transmitting mechanism C1 to provide controlled engagement of this torque-transmitting mechanism. When the torque-transmitting mechanism C1 is engaged, the vehicle will begin moving forward in the first or lowest range of operation. Also, during the first forward range of operation, the control pressure in passage 60 is distributed via C1 valve 30 to the differential area bias 46 on the regulator valve 28. Thus, during operation in the first forward speed range, the system pressure is set at approximately 230 psi in comparison with the reverse pressure of 270 psi. This does reduce the load on the pump 22, thereby improving the overall efficiency of the transmission.

Upon a ratio interchange from first to second (FIG. 5), the solenoid valve 72 is turned off, thereby eliminating the bias pressure on the C1 valve 30. However, the torque-transmitting mechanism C1 is fed through the valve 30 and exerts a pressure setting force on the differential area, present in the C1 logic valve 30 between lands A and B, such that the C1 valve 30 remains in the pressure set position. During the ratio interchange from first to second, the torque-transmitting mechanism C5 is reduced in torque capacity while the torque-transmitting mechanism C4 is increased in torque capacity by the pressure distributed thereto from the trim valve 36 as controlled by the solenoid 66 and the pressure in passage 84.

When the first to second interchange has been completed (FIG. 6), the solenoid valve 72 is turned on to reestablish the pressure bias in the passage 104 thereby shifting the C2 valve 80 from the spring set position to the pressure set position. The bias from the torque-transmitting mechanism C5 was eliminated during the initial phase of the 1–2 ratio change. Also, during the second forward ratio, the pressure in the control passage 60 is distributed through the valve 30 to the bias area 46 on the main regulator valve 28.

To establish the third forward speed ratio (FIG. 7), the trim valve 62 is actuated to increase the torque capacity of the torque-transmitting mechanism C3 while the torque capacity of the torque-transmitting mechanism C4 is reduced by the trim valve 36 as controlled by the solenoid valve 66. The torque-transmitting mechanism C1 remains engaged during the third speed ratio.

The fourth speed ratio is established (FIG. 8) by reducing the torque capacity of the torque-transmitting mechanism C3 while increasing the torque capacity of the torque-transmitting mechanism C2. The torque capacity of the torque-transmitting mechanism C2 is determined by the fluid pressure in the passage 78 which is distributed from the trim valve 34 through the passage 78, the valve 80, passage 108, the valve 30, the passage 106, back through the valve 80 and to the passage 118. During the third and fourth forward speed ratio, the torque-transmitting mechanism C1 remains engaged and the bias pressure in the passage 60 is maintained at the bias area 46.

To establish the fifth forward speed ratio (FIGS. 9 and 10), the torque-transmitting mechanism C1 is reduced in capacity by controlling the trim valve 38 while the torque capacity of the torque-transmitting mechanism C3 is increased by controlling the output of the trim valve 32. In the initial phase of the establishment of the fifth forward speed ratio (FIG. 9), the control pressure in passage 60 remains connected with the bias area 46 on the main regulator valve 28. When the fifth forward speed ratio has been fully engaged (FIG. 10), the solenoid valve 72 is turned off, thereby eliminating the bias pressure on the tops of the valves 30 and 80. The valve 30 returns to the spring set position; however, the valve 80 remains in the pressure set position due to the pressure differential area between the top two lands C and D of the valve 80 which is subject to the pressure in the torque-transmitting mechanism C2.

When the valve 30 returns to the spring set position, the passage 106 is connected directly with the main passage 26, such that the torque-transmitting mechanism C2 is maintained engaged without a need for fluid pressure from the trim valve 34. Also, as the valve 30 assumes the position shown in FIG. 10, the pressure output from the trim valve 34 in passage 78 is directed through the valve 80 to the passage 108 and then through the valve 30 to the passage 48, which is communicated with the bias area 46 of the main regulator valve 28. Under this condition, the bias pressure on the main regulator valve 28 can be controlled through a wide range of pressure values from zero to system pressure as established by the solenoid 64 and the trim valve 34. Thus, the operating pressure in the fifth speed ratio can be greatly reduced, thereby further increasing the overall efficiency of the transmission. The pressure in passage 48, whether distributed from the passage 60 or from the trim valve 34 is termed a "knockdown" pressure and its function is to reduce the pressure output or "knockdown" the pressure output from the main regulator valve 28.

To establish the sixth forward speed ratio (FIG. 11), the torque-transmitting mechanism C2 is maintained in engagement through the valves 30 and 80, as described above for the fifth forward speed ratio, the pressure in the torque-transmitting mechanism C3 is reduced, thereby reducing the torque capacity thereof, while the torque capacity of the torque-transmitting mechanism C4 is increased by fluid pressure from the trim valve 36 as established by the solenoid valve 66.

Ratio downshifting through the speed ranges, of course, is essentially the opposite of the upshifting schedule. During a downshift from fifth to fourth ratios, the valve 30 is pressurized by output from the solenoid 72 such that control of the torque-transmitting mechanism C2 is returned to the trim valve 34 such that the torque-transmitting mechanism C2 will be disengaged upon a downshift from fourth to third.

It should now be apparent to those skilled in the art that the hydraulic control system as described in FIGS. 2 through 11 does not have a manual valve. Therefore, there is no direct mechanical connection between the operator and the hydraulic control system.

The control system is operated purely on electrical signals that may be discontinued if the electrical system within the vehicle is discontinued for some reason. Should this happen during the operation in reverse or neutral, the control system will assume the position established in FIG. 12. As seen there, the trim valve 32 and the trim valve 38 are both supplying fluid pressure. That occurs because both of these valves are normally open valves, that is, when no electrical signal is present, the control pressure in the respective passages 74 and 86 is at a maximum value and therefore the output pressure of the trim valves 32 and 38 is at a maximum pressure. The trim valve 32 will actuate the torque-transmitting mechanism C3; however, no other torque-transmitting mechanisms will be actuated.

Figure 13:
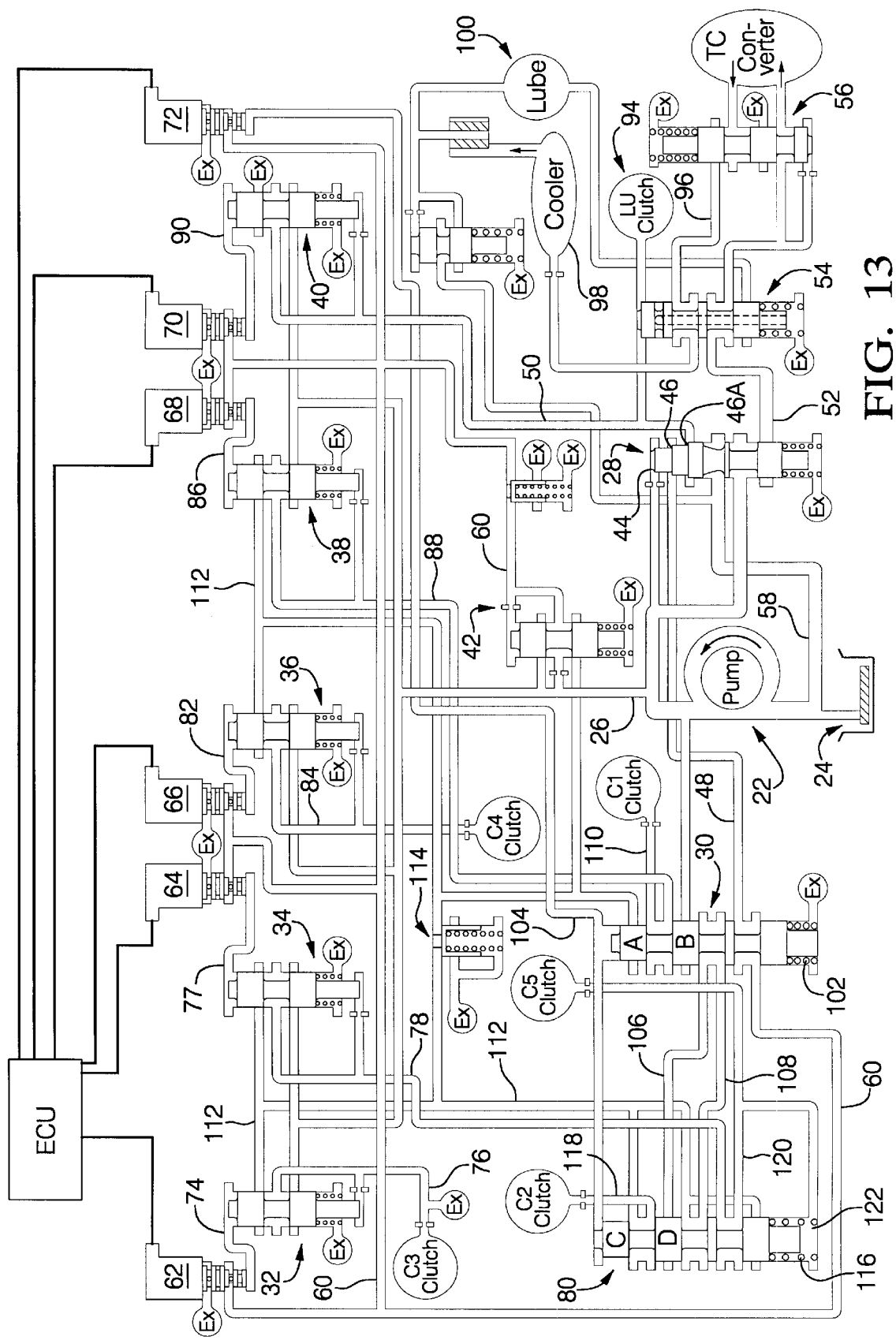
FIG. 13 is a diagrammatic representation of the electro-hydraulic control mechanism incorporating the present invention describing the control system operating in the third forward speed range when electrical power has been discontinued.
Figure 14:
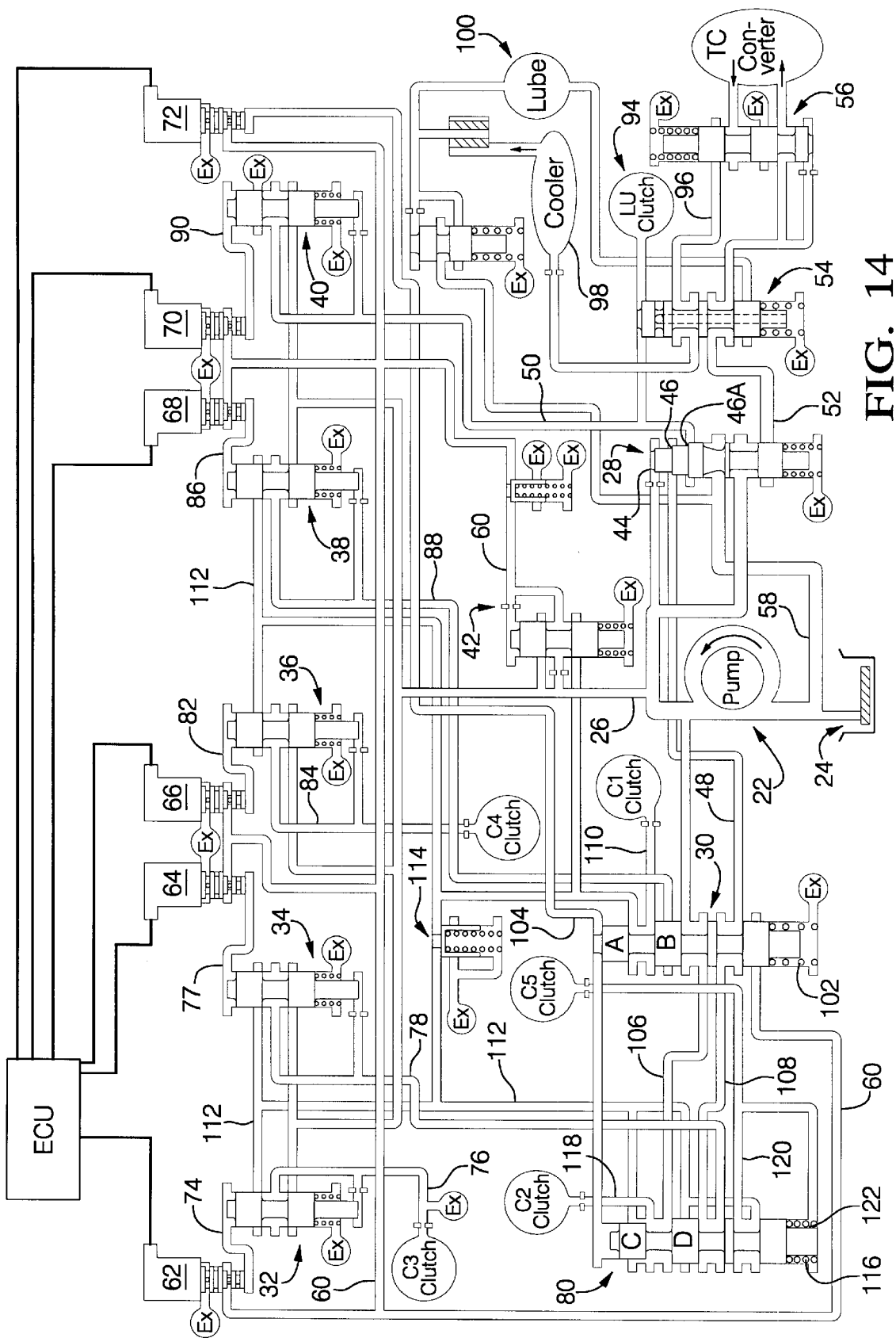
FIG. 14 is a diagrammatic representation of the electro-hydraulic control mechanism incorporating the present invention conditioned for the fifth forward speed range when electrical power has been discontinued.

However, if the transmission is operating in the ranges of first through fourth and the electrical power should be discontinued, the control system will be placed in the position shown in FIG. 13. In this condition, the torque-transmitting mechanism C1 is engaged and the torque-transmitting mechanism C3 is engaged. As with reverse and neutral, the torque-transmitting mechanism C3 becomes engaged because of the normally open trim valve 32. The torque-transmitting mechanism C1 becomes engaged because it was engaged in first through fourth ranges. When the torque-transmitting mechanism C1 has become engaged, the differential area on the valve 30 maintains the torque-transmitting mechanism C1 engaged and the trim valve 38 remains fully open upon discontinuance of electrical power such the torque-transmitting mechanism C1 remains engaged. Thus, the vehicle will operate in the third range to permit the driver to return to a repair facility under reduced speed conditions.

If the electrical system should discontinue during fifth or sixth forward speed range (FIG. 14), the torque-transmitting mechanism C3 will again remain engaged, as described above, and the torque-transmitting mechanism C2 will remain engaged through fluid pressure delivered directly from the pump 22 through the valves 30 and 80 to the torque-transmitting mechanism C2. It should be noted that in both the fifth and sixth ranges, this is precisely the actuation of the torque-transmitting mechanism C2. That is, the trim valve 34 is not utilized in fifth and sixth ranges to maintain the torque-transmitting mechanism C2 engaged. This permits some high-speed limp-home capabilities; however, it does have reduced gradeability for the vehicle.

Also during electrical discontinuance in the fifth forward speed ratio, the system pressure is maintained at a maximum value to ensure sufficient torque capacity at the torque-transmitting mechanisms C2 and C3. During electrical discontinuance in the third forward speed ratio, the main system regulator is reduced in output pressure by the pressure in passage 60 acting on the bias area 46.

The torque converter clutch 94 can be engaged through the control of the solenoid 70 and trim valve 40 at any time during transmission operation. The normal occurrence of the engagement of the torque-transmitting clutch is between the second and sixth forward ratios of operation. It is possible to engage the torque converter clutch in the first ratio if for some reason direct engine braking might be more desirable than engine braking through the torque converter TC.

What is claimed is:

1. A fly-by-wire electro-hydraulic control mechanism for a power transmission having a plurality of torque transmitting devices selectively engageable by said control mechanism to provide six forward speed ratios including four lower speed ratios and two higher speed ratios, a neutral condition, and a reverse speed ratio, said electro-hydraulic control mechanism comprising:

a main source of hydraulic fluid pressure including a variable pressure regulator valve having at least one bias area;

a control source of control pressure receiving fluid from said main source and delivering a reduced control pressure;

an electrical source of electrical control signals;

a plurality of solenoid valves communicating with said control source and being selectively operable in response to signals from said electrical source trim control pressures, at least two of said solenoids being normally open to supply hydraulic pressure from said control source during a discontinuance of said electrical control signals and when said main source is supplying fluid;

a first trim valve operable in response to said trim control pressure from one of said normally open solenoid valves to direct fluid from said main source to a first of said torque transmitting devices and to maintain said first torque transmitting device engaged during a discontinuance of electrical control signals when said transmission is in any of the six forward speed ratios and said main source is supplying hydraulic fluid;

a second trim valve operable in response to said trim control pressure from another of said normally open solenoid valves to direct fluid from said main source;

a third trim valve operable in response to said trim control pressure from a third of said solenoid valves for supplying a variable fluid pressure;

a first logic valve having a spring set position and a pressure set position, said first logic valve being connected in fluid communication between said third trim valve and a second and a third of the torque transmitting devices;

a second logic valve having a spring set position and a pressure set position, said second logic valve being in fluid communication between said second trim valve and a fourth of said torque transmitting devices, and also being in fluid communication with said main source, said control source, said first logic valve, and said bias area on said variable pressure regulator valve, said second logic valve being operable to direct hydraulic fluid from said control source to said bias area during said pressure set position, and being operable to deliver a variable fluid pressure from said third trim valve to said bias area when said first logic valve is in said pressure set position and said second logic valve is in said spring set position.

2. The fly-by-wire electro-hydraulic control defined in claim 1 further comprising:

said first logic valve being operable in said spring set position to direct engagement fluid to said second torque transmitting device and in said pressure set position to direct engagement fluid to said third torque transmitting device.

3. The fly-by-wire electro-hydraulic control defined in claim 1 further comprising:

said first and second logic valves cooperating to direct engagement fluid to said second torque transmitting device when said source of electrical signals is discontinued, said main source is supplying fluid, said first logic valve is in said pressure set position, said second logic valve is in said spring set position, and the power transmission is operating in one of the two higher forward speed ratios prior to the discontinuance of the electrical signals.

4. The fly-by-wire electro-hydraulic control defined in claim 1 further comprising:

said second logic valve having a first pressure set bias area that is subject to fluid pressure from said second trim valve to latch said second logic valve in said pressure set position when the transmission is operating in any of the four lower forward speed ratios to maintain said fourth torque transmitting device engaged during a discontinuance of the electrical signals and said main source is supplying hydraulic fluid.

5. The fly-by-wire electro-hydraulic control defined in claim 1 further comprising:

said first logic valve having a second pressure set bias area subject to pressure from said main source through said second logic valve in said spring set position to maintain said first logic valve in said pressure set position during operation of the transmission in the two higher forward speed ratios.

* * * * *